United States Patent [19]

Guglielmo, Sr.

[11] 4,131,700

[45] Dec. 26, 1978

[54] COMPOSITION OF MATTER FOR TREATING A CLOSED CELL FOAM SUBSTRATE

[76] Inventor: Richard J. Guglielmo, Sr., Lambs La., Cresskill, N.J. 07626

[21] Appl. No.: 704,307

[22] Filed: Jul. 12, 1976

[51] Int. Cl.² ............................ B05D 3/00; B05D 3/12
[52] U.S. Cl. ............................... 427/322; 260/32.8 R; 260/33.8 UA; 427/140; 427/385 B; 427/407 C; 428/315
[58] Field of Search ........... 427/322, 140, 384, 385 B, 427/407 R, 407 C; 428/315, 286, 246; 220/32.8 R, 33.8 UA

[56] References Cited

U.S. PATENT DOCUMENTS

| 2,234,611 | 3/1941 | Trumbull | 427/322 |
|---|---|---|---|
| 3,084,065 | 4/1963 | Bach | 260/32.8 |
| 3,086,952 | 4/1963 | Newton | 260/32.8 |
| 3,244,571 | 4/1966 | Weisman | 428/315 |
| 3,336,180 | 8/1967 | Werner | 428/315 |
| 3,338,846 | 8/1967 | Klopfer | 260/33.8 |
| 3,338,857 | 8/1967 | Shur et al. | 260/32.8 |
| 3,360,415 | 12/1967 | Hellman et al. | 427/385 B |
| 3,535,196 | 10/1970 | Laberinti et al. | 428/315 |
| 3,591,568 | 7/1971 | Farber | 260/32.8 |
| 3,597,373 | 8/1971 | Bregoff et al. | 260/32.8 |
| 3,778,401 | 12/1973 | Hayworth | 260/33.8 |

Primary Examiner—Ronald H. Smith
Assistant Examiner—Sadie L. Childs
Attorney, Agent, or Firm—Marn & Jangarathis

[57] ABSTRACT

There is disclosed a composition of matter which is used for treating a vinyl-coated foam substrate, such as a gym mat or the like to recondition such substrate, and which is comprised of a vinyl copolymer and a plasticizer in a solvent system including a ketone and a chlorinated hydrocarbon.

12 Claims, No Drawings

COMPOSITION OF MATTER FOR TREATING A CLOSED CELL FOAM SUBSTRATE

This invention relates to a composition of matter, and more particularly to a composition of matter for reconditioning a vinyl-coated substrate particularly a vinyl-coated closed cell foam substrate.

BACKGROUND OF THE INVENTION

In co-pending application Serial No. 643,699, filed Dec. 23, 1975, now U.S. Pat. No. 4,046,587 assigned to the same assignee as the present invention, there is disclosed a primer composition which is coated on a polyolefinic-containing closed cell foam prior to application of the vinyl film and which is preferably comprised of a chlorinated hydrocarbon solvent in which there are added a material selected from the group consisting of a chlorinated paraffin, an acrylic type ester, and a vinyl copolymer to form an acceptable impact absorbing article, e.g., gym mats and the like.

After a certain period of use, such a gym mat may be replaced or must be reconditioned necessitating a return to the manufacturer with the concomitant handling costs of packing, shipping, etc. To date, the most practical workable system for reconditioning and recoating gym mats is the use of a highly flammable vinyl solution coating whose major danger is flammability, particularly in closed areas. Alternately, the mat may be reconditioned, in situ, requiring the handling of highly dangerous and flammable materials used by a manufacturer, usually necessitating the adherence to special ventilation procedures and to the use of protective masks and special equipment and procedures for handling flammable solvents.

Further, the facile manufacture of free-exercise mats from such closed-cell polyolefinic foams, i.e., by adhering a woven or non-woven fabric to such a foam substrate, has suffered due to the lack of composition having required properties of tackiness, adhesiveness, flexibility and the like.

OBJECTS OF THE INVENTION

It is an object of the present invention to provide a novel composition of matter for reconditioning a vinyl-coated substrate.

Another object of the present invention is to provide a novel composition of matter for applying in a facile way a vinyl film to a closed-cell foam substrate.

Still another object of the present invention is to provide a novel composition of matter for reconditioning a vinyl-coated closed-cell foam.

A further object of the present invention is to provide a novel composition of matter for reconditioning a vinyl-coated substrate while reducing the danger, equipment and procedures associated with highly flammable solvents.

A still further object of the present invention is to provide a novel composition of matter for reconditioning a vinyl-coated substrate providing short drying and curing periods.

Still another object of the present invention is to provide a novel composition of matter for applying in a facile manner a woven or non-woven fabric to an expanded closed-cell foam substrate.

Another object of the present invention is to provide a novel composition of matter which is exempt from the present EPA standards.

SUMMARY OF THE INVENTION

These and other objects of the present invention are achieved by a composition of matter comprised of a vinyl copolymer and a plasticizer in a solvent system including a ketone and a chlorinated hydrocarbon.

DETAILED DESCRIPTION OF THE INVENTION

Further objects and advantages of the present invention will be had from the following detailed description thereof.

The system of the present invention meets the following requirements:
1. Classified as a combustible Class 3 liquid.
2. Safely used with proper ventilation and simple protective masks normally used by operators.
3. Simple application techniques, e.g., spraying, roller coating, painting, etc.
4. Dries at room temperature within a short period of time to permit successive applications thereof and yet possess the required physical properties of high elongation, tensile strength, etc., to provide "as-new" protective and wear qualities.
5. Compatability to existing substrates, foam or vinyl coated foams.

Accordingly, the systems include a flexible vinyl co-polymer and a plasticizer therefor in a solution of solvents comprised of fast drying chlorinated hydrocarbons and strong solvating ketones.

The solution of solvents should contain a maximum amount of chlorinated hydrocarbons as possible in order to obtain a system which will depress a lighted flame as well as keep the flash point of the system at the highest point possible preferably above 150° F. In order to obtain a high vinyl solids content, the solvent system should contain enough ketone or other vinyl solvating solvents. Since ketone or high vinyl solvating solvents are usually quite flammable, a balance of the chlorinated hydrocarbons and ketone is necessary to obtain the proper properties. Obviously, a maximum chlorinated hydrocarbon to high solvating ketone solvent should be used. During application of the composition, the solvent balance must be such that upon drying the coating will level and flow to a smooth continuous film. A solvent unbalance results in air bubbles and many air pockets causing weakness in the finish film product.

The chlorinated hydrocarbon solvent includes those listed in the Raw Materials Index Solvent Section of the "National Paint and Coating Association" on Pages 47 and 48 designated Sct. No. 1 April 1973 from a publication dated October 1972 constituting a superceding publication dated June 1968 and include, for example, methylene chloride, ethylene dichloride, trichloroethylene, trichloroethylene propylene dichloride, monochlorobenzene, 1,2,4-trichlorobenzene and the like. 1,1,1-trichloroethane being less toxic has been found to be particularly useful since it may be readily handled with standard ventilation requirements. Some of the other chlorinated solvents are quite toxic requiring special handling procedures.

Strong vinyl solvating ketones include methyl isobutyl, cyclohexanone and solutions thereof.

The solids content for practical and economical purposes should be between about 25 to 30% by volume. In order to obtain such a solids level, in addition to fluid quick drying, there is employed a low molecular high acetate content vinyl chloride copolymer. Although such a resin allows maximum solids build, it in itself is also quite soft, so that the flexibilizer or plasticizer must be the right balance and at the proper level to resin. A vinyl copolymer includes those sold by Tenneco under the trademark "Blacar" together with a number designation, e.g. 315, 314, 380, 382, 384.

A plasticizer for such a low molecular weight, high acetate content vinyl chloride copolymer resin when such composition is to be used for re-conditioning a vinyl coated gym mat is comprised of both monomeric and polymeric plasticizers whereas for use in the manufacture or repair of a free exercise mat only the monomeric plasticizer is used.

In actual use, pigment is added to the foregoing composition of matter and may be effected during formulation or by admixing shortly prior to actual use.

The following Table I lists specific ingredients and ranges thereof in a particularly preferred form of the invention:

| Ingredients | Ingredient Range Max: | Min: |
| --- | --- | --- |
| Methylene Chloride | 35 | 25 |
| 1,1,1-Trichloroethane | 35 | 25 |
| MIBK | 10 | 0 |
| Cyclohexanone | 10 | 0 |
| Vinyl Copolymer Resin | 25 | 15 |
| Polymeric Plasticizer | 4 | 1 |
| Monomeric Plasticizer | 8 | 2 |
| Pigment | 3 | 1 |

The resulting system or composition of matter is a product which does not flash under test conditions, but does flash outside the test apparatus at above 150° F., which is a liquid highly stable solution which easily applies by brush, roller or spray and which upon drying is highly compatible with the substrate to which it is applied; which dries quickly; and which when applied in 2 to 3 coats provides adequate color coverage and millage buildup to produce a finished product with acceptable physical properties.

Generally, to obtain exceedingly excellent results, the composition is applied by spraying (hot or cold) or by painting (roller or brush) at a temperature generally from 50° F. to about 140° F. Pre-cleaning and washing with a solvent, such as the solvent system of the present invention, is generally recommended to remove from the surface, dirt, grease and the like.

The system or composition of matter of the present invention has been discussed with reference to the reconditioning of vinyl coated closed-cell foams, such as those used as gym mats. I have also found in a particularly preferred form of the invention, that newly prepared closed-cell foam substrates may be vinyl coated. It will be understood that for other applications, for instance, vinyl coated automobile roof, that certain of the aforementioned materials may be omitted.

For example, the ketone solvent portion may be solely MIBK or cyclohexanone. Since the pigment is not an essential ingredient, the pigment may be subsequently added. As hereinabove mentioned, when using the composition as a vehicle for adhering a woven or non-woven fabric to a closed-cell foam, the polymeric plasticizer may be omitted.

EXAMPLE OF THE INVENTION

The following example is illustrative of the present invention:

EXAMPLE

A vinyl coated polyvinyl chloride closed cell foam is coated by roller painter with a conditioner comprised of the following components:

| Ingredient | % by weight |
| --- | --- |
| Methylene Chloride | 34.5 |
| 1,1,1-trichloroethane | 34.5 |
| MIBK | 1.5 |
| Cyclohexanone | 6.5 |
| Vinyl Copolymer Resin | 15.0 |
| Polymeric Plasticizer | 2.0 |
| Monomeric Plasticizer | 4.0 |
| Pigment | 2.0 |
| Total | 100 |

After one hour, the coating is dry enough to permit application of another coating of the conditioner. After 24 hours, the coating is cured and may be handled in the usual manner.

While the present invention has been described with reference to reconditioning gym mats, it will be appreciated that other items may be made of such a vinyl coated film, e.g., wall panels and the like, may be reconditioned using the composition of matter of the present invention.

I claim:

1. A vinyl coating solution for treating a foam material to provide a vinyl film coat thereon which comprises:
   a vinyl copolymer, a chlorinated hydrocarbon solvent, a vinyl solvating solvent, and a plasticizer, said vinyl copolymer being a high acetate content vinyl choride copolymer, said solution having a flash temperature above about 150° F.

2. The vinyl coating solution as defined in claim 1 wherein said vinyl solvating solvent is selected from the group consisting of methyl isobutyl ketone, cyclohexanone, and solutions thereof.

3. The vinyl coating solution as defined in claim 1 wherein said vinyl copolymer constitutes of from 15 to 25 percent by weight of said composition.

4. The vinyl coating solution as defined in claim 4 wherein said plasticizer is a monomeric plasticizer.

5. The vinyl coating solution as defined in claim 1 wherein said plasticizer is a blend of monomeric and polymeric plasticizers.

6. The vinyl coating solution as defined in claim 1 wherein said chlorinated solvent is selected from the group consisting of methylene chloride, 1,1,1-trichloroethane and solutions thereof.

7. The vinyl coating solution as defined in claim 1 and including a minor amount of a pigment.

8. A process for treating a foam material to provide a vinyl film thereon which comprises coating said foam material with a vinyl coating solution formed by admixing a vinyl copolymer and plasticizer therefor in a solvent system having a flash temperature above about 150° F. and including a chlorinated hydrocarbon solvent and a vinyl solvating solvent and thereafter applying said composition of matter to said foam material at a temperature of from 50° to about 140° F.

9. The process as defined in claim 8 and including the step of pretreating said foam material to clean the surface thereof.

10. The process as defined in claim 8 wherein said vinyl copolymer constitutes of from 15 to 25 percent by weight of said composition.

11. The process as defined in claim 8 wherein said plasticizer is a monomeric plasticizer, and further including the step of overlaying said foam with a fabric.

12. The process as defined in claim 8 wherein said plasticizer is a blend of monomeric and polymeric plasticizers.

* * * * *